No. 799,606. PATENTED SEPT. 12, 1905.
G. LINDENTHAL.
CAR TRUCK.
APPLICATION FILED OCT. 23, 1903.

7 SHEETS—SHEET 1.

Fig. 1.

Witnesses

Inventor
Gustav Lindenthal,
By
Thos. E. Robertson
Attorney

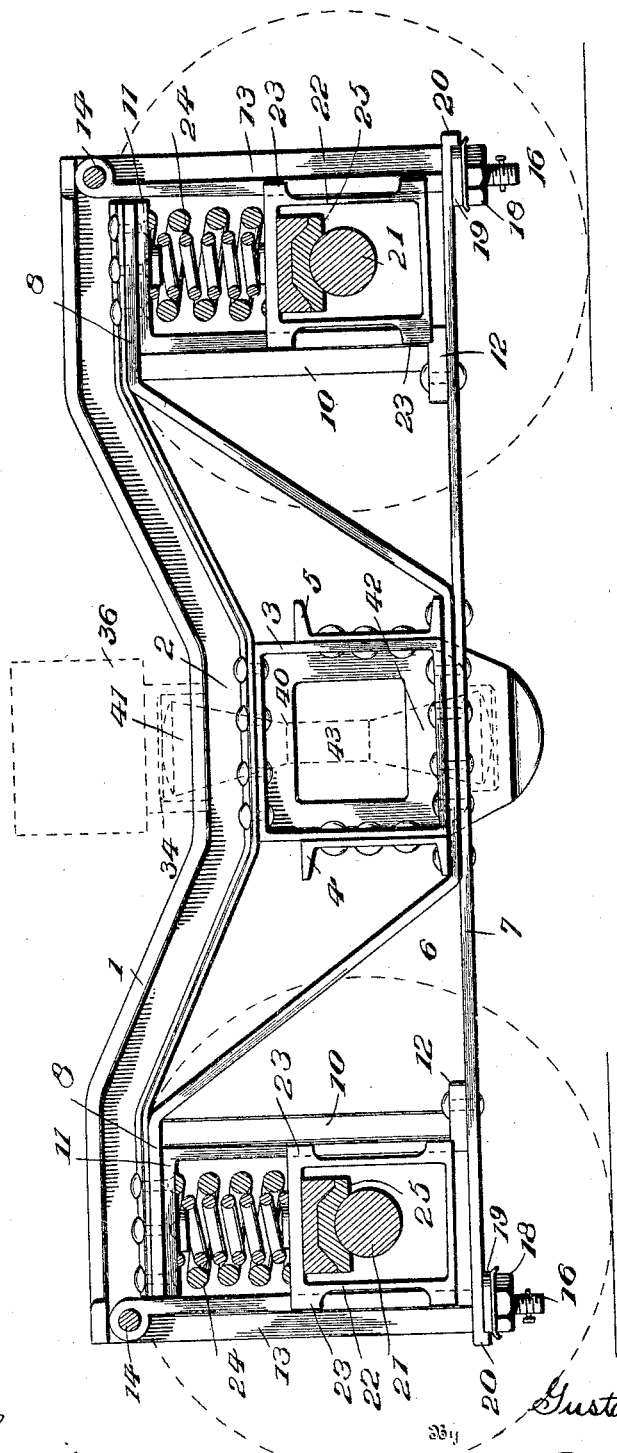

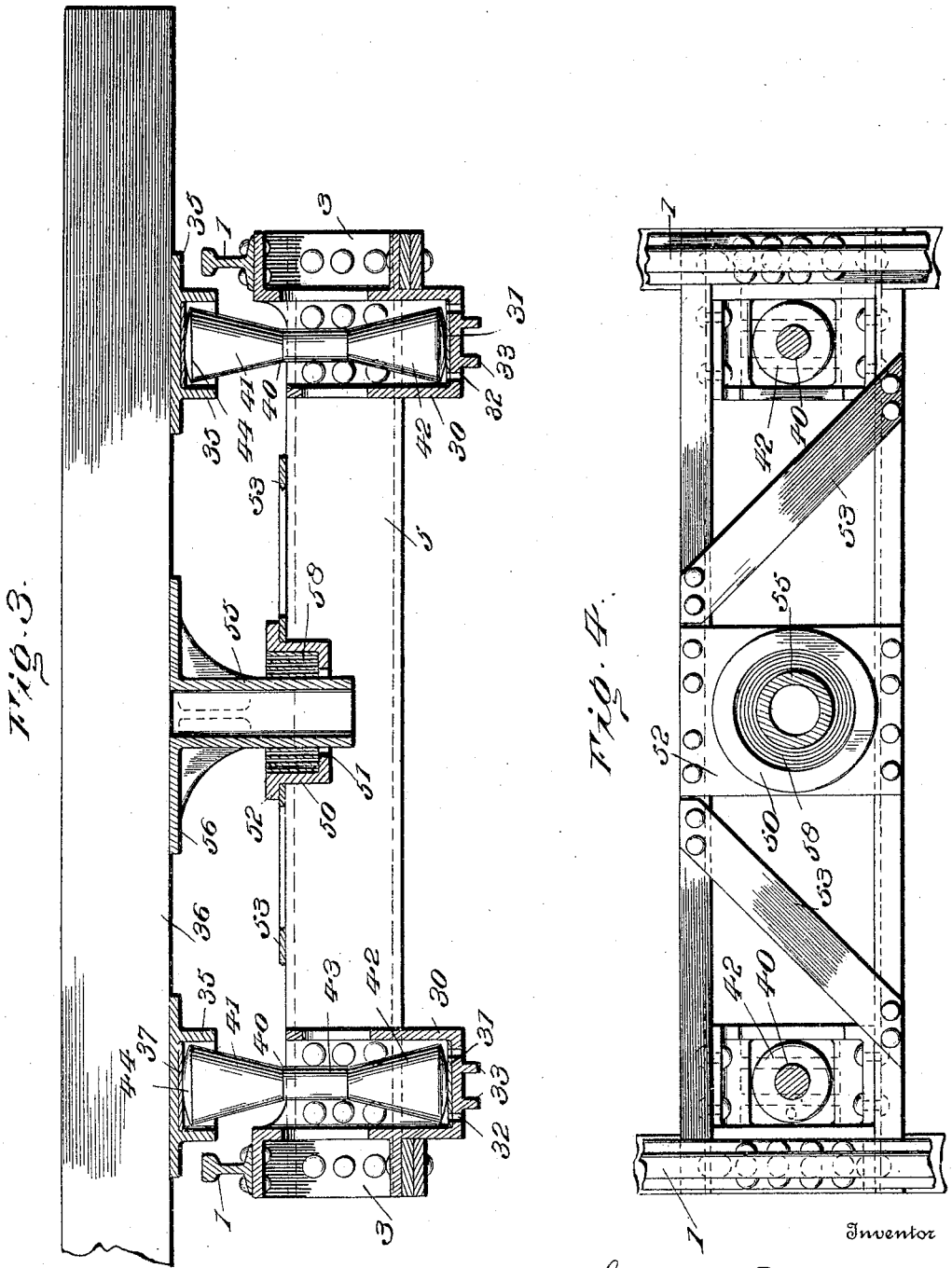

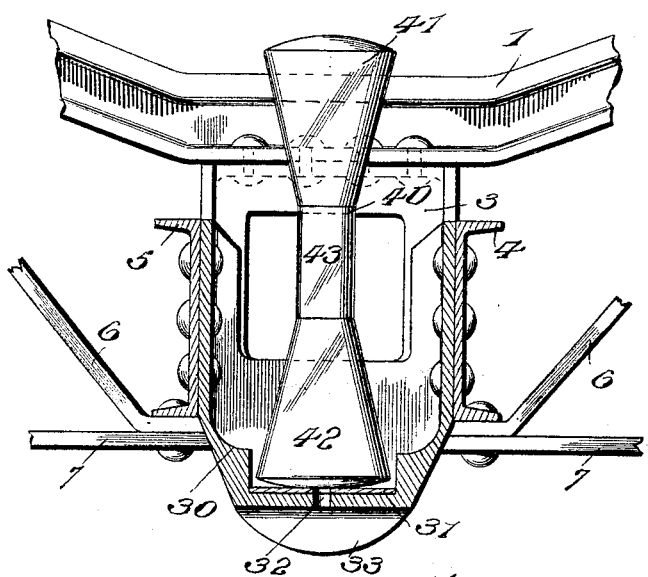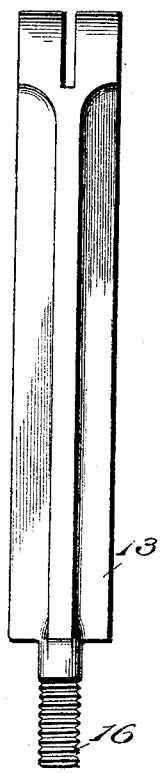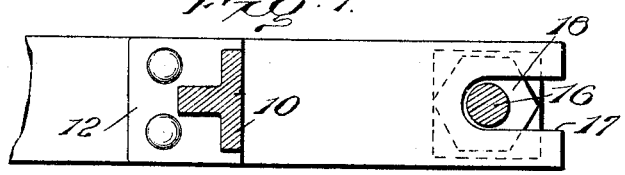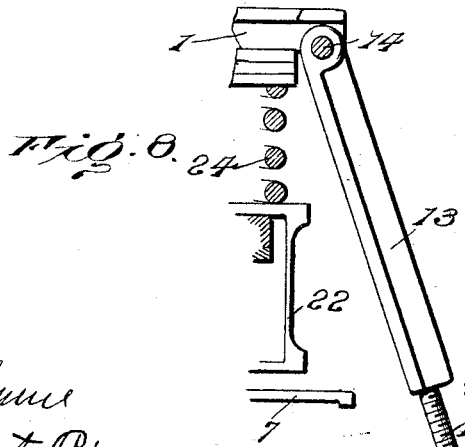

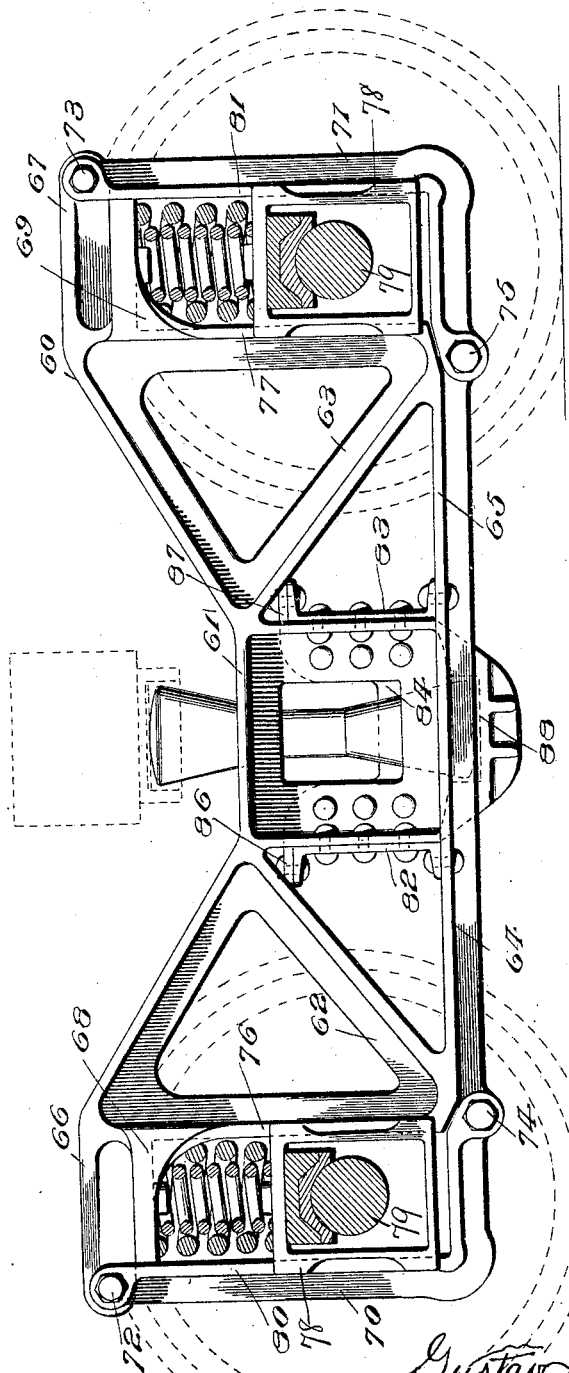

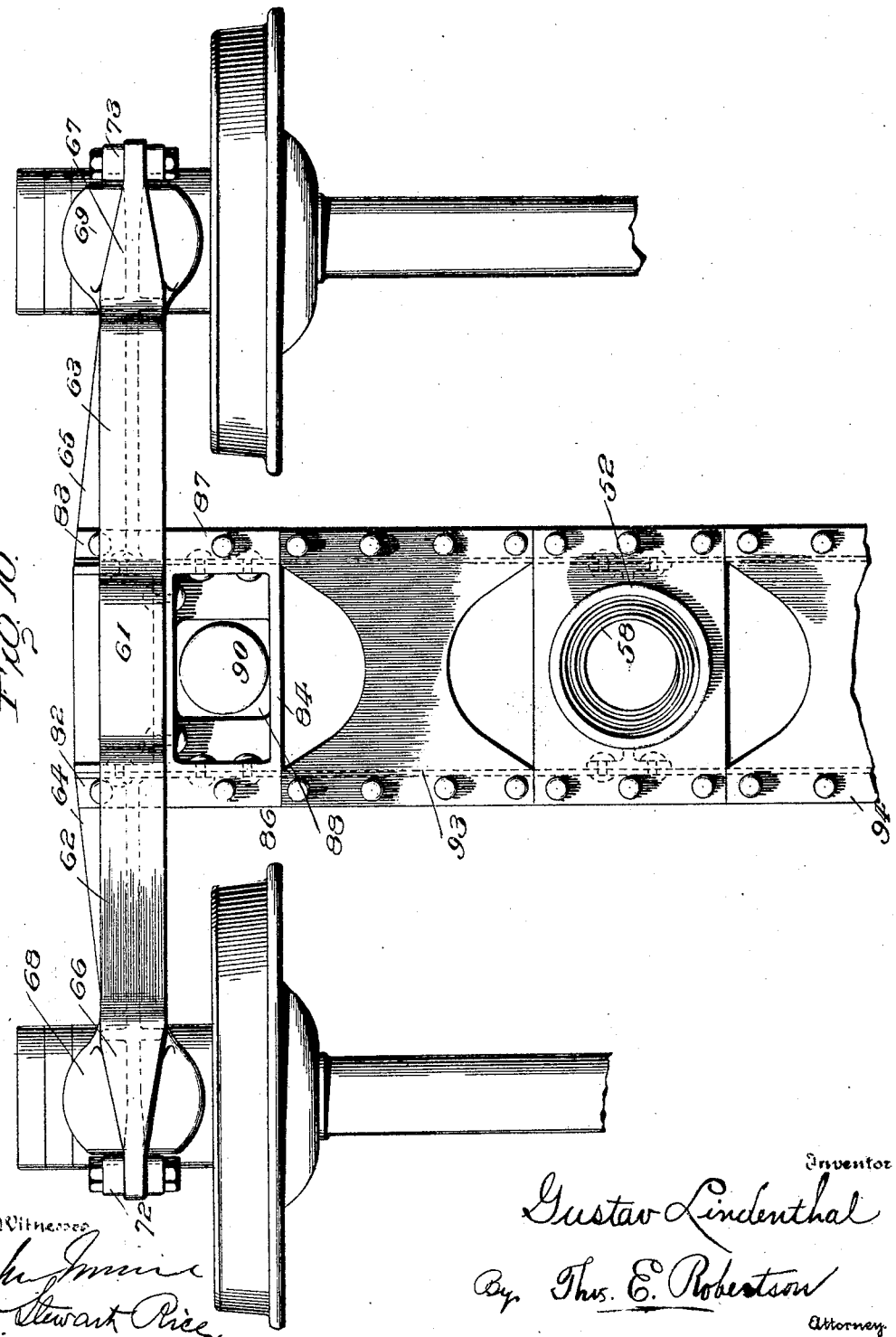

No. 799,606. PATENTED SEPT. 12, 1905.
G. LINDENTHAL.
CAR TRUCK.
APPLICATION FILED OCT. 23, 1903.
7 SHEETS—SHEET 7.
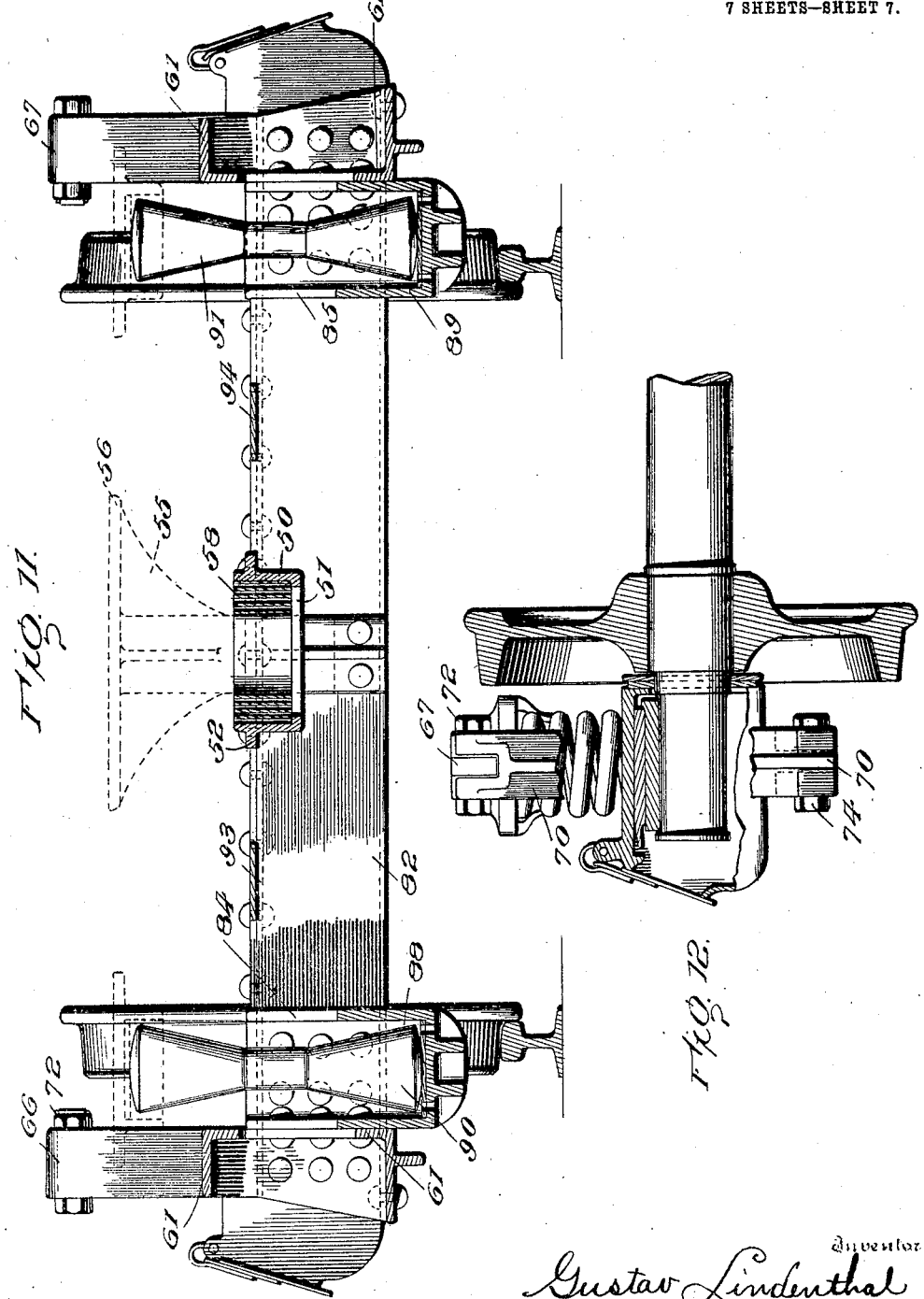

UNITED STATES PATENT OFFICE.

GUSTAV LINDENTHAL, OF NEW YORK, N. Y.

CAR-TRUCK.

No. 799,606. Specification of Letters Patent. Patented Sept. 12, 1905.

Application filed October 23, 1903. Serial No. 178,265.

*To all whom it may concern:*

Be it known that I, GUSTAV LINDENTHAL, a citizen of the United States of America, and a resident of New York city, in the county and State of New York, have invented certain new and useful Improvements in Car-Trucks, of which the following is a specification.

This invention relates to an improvement in car-trucks intended especially for carrying the excessively heavily laden freight-cars now in use; and the main object of the invention is to invent a truck in which the whole weight is borne by side rocking or rolling supports, so that no weight is carried by the center pivot or the bearing around it. This object is preferably accomplished by supporting the car-body on two or more spherical-ended rockers at each end of the car, so that there are four or more supports in all, and by having the body controlled at each end in its lateral and swinging movements by a center bearing, or rather swivel, which merely holds the car-body laterally and receives none of its weight. The spherical-ended rockers or supports are preferably dropped into pockets supported by the truck, and their ends are formed of such curvatures that in turning or swinging upon them the car is given an even and regular movement without being elevated.

A further object is of course to provide a truck which shall be able to withstand the enormous demands made by the heavy loads now carried and yet be constructed at a minimum cost and be unlikely to get out of order.

With these objects and an improved truck generally in view my invention may be said to consist of a truck of the character hereinafter more particularly described in detail and then definitely set forth by the appended claims.

In the accompanying drawings, which it will be understood represent the preferable though not necessary embodiment of my invention, Figure 1 is a perspective view of my improved truck with the car-body removed. Fig. 2 is a side elevation, partly in section, of the same with the cross-sill of the car-body shown in dotted lines. Fig. 3 is a vertical cross-section of the truck, taken on a line passing through the spherically-ended rockers or supports. Fig. 4 is a horizontal section of the same. Fig. 5 is a detail sectional view showing one of the spherical-ended rockers seated in the dropped pocket of the transom-casting, this figure being viewed from the inside. Figs. 6, 7, and 8 are details of the end of the truck, showing the method of housing the journal-boxes and removing the same. Fig. 9 is a side elevation, partly in section, of a modified form of truck with the cross-sill shown in dotted lines, this figure showing the same general character of truck with the exception that the side frame is a casting instead of being made of structural iron. Fig. 10 is a top plan view of the truck shown in Fig. 9. Fig. 11 is a vertical cross-section of the form shown in Figs. 9 and 10, taken on a line running through the dropped box and the central pivot. Fig. 12 is a section through one of the journal-boxes.

Referring now to the details of the drawings by numerals, 1 indicates an upper compression member, which is, by preference, made of T-rail section, but may, of course, be made of rolled-iron or steel of any desired structural formation. This upper compression member is bent upwardly at each end to afford increased room at the ends for the journal boxes and springs. This forms a diamond frame with the middle part depressed to afford room for the car-sills and its motion around curves. To the depressed central portion 2 of this upper compression member is securely riveted a cast-steel transom-casting 3, and to the sides of this casting are riveted the channel-iron transoms 4 and 5, which extend over and are similarly riveted to the transom-casting at the opposite side of the car, as clearly shown in Figs. 1 and 4. Under the transom-castings 3 and their transoms 4 and 5 are riveted the usual tension member 6 and tie-bar 7, the first of which is bent upwardly on each side and then horizontally, as shown at 8, and the horizontal members 8 are riveted to the horizontal parts of the compression member 1. The tie-bar 7 extends, preferably, horizontally across the bottom of the truck, as usual. Between the horizontal parts of the upper compression member 1 and the trussed bar 6 on each side of the truck is secured an upright formed with a T-shaped vertical member 10 and horizontal portions 11 and 12, the first of which is riveted to the compression member 1 and the horizontal part 8 of the tension member 6 and the other, 12, to the tie-bar 7. This upright 10 thus forms a rigid connection between the parts just mentioned and in addition serves the purpose of a guide for the journal-box, as hereinafter described. As a companion or complemental part to the upright or guide 10 I employ a vertical guide 13, which may be secured in any desired manner, although I much prefer the construction shown in the drawings where the upper end of the upright guide 13 is shown as bifurcated, and between the furcations is situated the web of the upper compression member 1, to which it is pivoted at 14. The lower end of the upright guide 13 is rounded and provided with a base or foot 15, which rests upon the tie-bar 7 and has a screw-threaded portion 16, which is arranged to swing within a slot 17, formed in the end of the said tie-bar, a nut 18 being employed to secure the guide 13 in position. Between the nut 18 and the tie-bar 7 is a combined washer and nut-lock 19, (see Fig. 2,) which coacts with an offset or flange 20 to prevent the guide 13 from swinging outward. It will thus be seen that the uprights or guides 10 and 13 serve the double function of preventing the collapse of the ends of the truck under extreme prsssure and of a housing or inclosure for the journal-boxes. Owing to the fact that when the nut 18 is sufficiently loosened the supporting-guide 13 can be swung on its pivots 14, as shown in Fig. 8, the journal or axle 21, with its boxes 22, can be rolled out of the ends of the truck without in any way removing the latter from the car. I am aware that this feature is broadly old in many patents, but believe I am the first to construct an open-frame truck wherein substantially flat or bar-like compression and tension members and a tie-bar are connected together by a pivoted upright, which in addition to permitting the box and axle to be removed out of the end of the truck also acts as a rigid support to give the proper rigidity to the aforesaid members in the severe work they necessarily have to perform.

The journal-box 22, hereinbefore incidentally mentioned, may be of any desired construction; but I prefer one made with flanged parts 23 to lap over on opposite sides of the uprights 10 and 13, and thus retain the boxes in position and yet permit of vertical movement of the same. Situated between the boxes 22 and the horizontal member 11 of the tension member 6 are the usual springs 24, so that it will be manifest that any load which is borne by the truck proper will be transmitted through these springs 24 onto the boxes 22 and through their "brasses" 25 to the axle or journal 21.

I shall now again refer to the transom-castings 3, which have been described as situated between the upper compression members 1 and the tension members 6 and as being connected by the channel-iron transoms 5. These transom-castings 3 are constructed to fill an additional office, which I deem as most important. As seen in perspective in Fig. 1 and in section in Fig. 3, each of these castings has a pocket 30, which is dropped below the level of the transoms 4 and 5 and the truck proper and is situated between the channel-iron transoms 5 and securely riveted thereto, as shown in the said Fig. 3. The bottom of the pocket or box 30 is provided with a hardened wear-plate 31, through which and the bottom are formed perforations or weep-holes 32, through which rain-water or moisture may pass. The bottoms of the pockets or boxes are also formed with ribs 33 on their exterior to increase their strength. I desire to call especial attention to the fact that these pockets are dropped rather low down, so as to receive the supports for the car-body, as will be hereinafter described. Situated immediately over the pockets 30 in the transom-castings 3 are the upper bearing-boxes 35, shown in Fig. 6 as being connected to the bottom or cross-sill 36 of the car-body. These upper bearing-boxes may also be provided with wearing-plates 37, if desired. Between the upper bearing-boxes 35 and the dropped pockets 30 (see Fig. 3) are situated my novel rockers or supports 40, which are made in the form of two truncated cones 41 and 42, joined by the center cylindrical part 43, the cones having spherical ends 44, as clearly shown. These spherical-ended rockers or supports are sections of a sphere or ball equal in diameter to the length of the rocker, and the idea is that each one represents a large iron ball or sphere bearing on top and bottom, which rolls between the upper bearing-box and dropped pocket whenever the car moves on a curve, so that it will be observed that there is always the same amount of space between the upper bearing-boxes 35 and the dropped pockets 30, even when the car moves to the maximum amount. This I deem important, as it enables me to support a car on four rockers, two being at each end, and thus the cars can move easier around the curves as less resistance is offered, especially when there is no friction on the center bearing, as will be described. I prefer to chill the spherical ends or bases of the rockers or supports; but this is not absolutely necessary.

Instead of using only one rocker on one side of each truck two may be used, making four at each end of the car, and if it is desired these rockers need not be one rigid piece, as shown, but may be made hollow with springs inside, in which case no spring will be needed over the journal-boxes.

I will now refer to Figs. 3 and 4, where my center bearing or rather swivel-bearing is shown. From these figures it will be seen that I have firmly riveted to the channel-iron transoms at a point immediately central to their ends a central bearing 50, which consists of a pocket having a central opening 51 and an upper flanged plate 52, by which the bearing is secured to the transoms, the latter being braced on each side of the bearing by diagonal braces 53. (Seen best in Fig. 4.) Projecting from the hereinbefore-mentioned central timber or cross-sill 36 is a preferably hollow pivot or king-pin 55, which is provided with a flanged top 56, by which it is secured to said sill. This pivot or king-pin extends downward and through the central bearing 50 and preferably has considerable play laterally therein, as the opening 51 is sufficiently large for this purpose. It will thus be understood that no weight whatever is borne by this central bearing or pivot-pin. To prevent lateral movement of the pin in the bearing except when it becomes necessary through excessive strain, I insert in the pocket of the bearing 50 a spiral spring 58, which is formed of steel ribbon and permits a lateral movement of one and one-half inches in any direction necessary. While I prefer this spring feature, it can be dispensed with, in which case there need be no movement of the pivot or king-pin within its pocket 50.

I will now refer particularly to Figs. 9 to 12 as illustrating a modification of the truck shown in Figs. 1 to 8, but in which the characteristic features are essentially the same, the main difference being that the side frames are formed of castings instead of structural iron. For some reasons I prefer this modified form of truck, although it will take only a mere examination to see that I employ side frames with depressed central portions to afford room for the car-sill and the motion around curves, that the bearings are on top of the journal-boxes, that the same form of "rockers" and central swivel is used, and that these rockers are dropped into pockets formed of transom-castings secured between the transoms to the center of the side frames. Referring now to the details of Figs. 9 to 12, the numeral 60 indicates the cast-steel side frame provided with a flanged central frame 61, triangular flanged frames 62 and 63 on the sides of said central frame 61, and horizontal stiffening members 64 and 65, connecting the bottom sides of said triangular and central frames. Two overhanging members 66 and 67 are cast integral with the aforesaid parts and are strengthened by the flanges or ribs 68 and 69, which also form a means of holding the springs in place. The side frames 60 are completed by L-shaped end pieces 70 and 71, the upper ends of which are bifurcated and pivoted at 72 and 73 to the upper horizontal members 66 and 67, and their other ends are bolted to the side frames, as seen at 74 and 75. The L-shaped end pieces may thus be swung outward on their pivots 72 and 73. As these end pieces are provided on their inner sides with vertical guides 76 and 77, said end pieces perform the double service of permitting the easy removal of the boxes 78 and axles 79 and of acting as guide-bars for the journal-boxes. Opposite the guides 76 and 77 are similar guides 80 and 81, formed on the side frames for the purpose of assisting the guides 76 and 77 in retaining the boxes in position. Firmly riveted to the sides of the central flanged frames 61 and extending from one side frame to the other are the transoms 82 and 83, formed of channel-iron identical with the transoms 4 and 5 of Figs. 1, 2, 3, 4, and 5. Between these transoms are my transom-castings (see Fig. 11) 84 and 85, riveted to the central frame 61 and to the sides of the channel-transoms 82 and 83. To assist in supporting these transom-castings, I form them with integral flanges 86 and 87, which flanges rest upon and are riveted to the tops of the transoms, as clearly seen in Fig. 9. The transom-castings are also formed with the dropped pockets 88 and 89, similar to the pockets 30 in Figs. 3 and 5. These pockets are provided with wear-plates and weep-openings, as in the other form, and the wear-plates support the rockers 90 and 91, identical in construction and function with the rockers hereinbefore described. The central or swivel bearing is identical with the form first described, and the only other departure is the bracing-plates 93 and 94, (shown in Fig. 10,) which have been substituted for the diagonal braces 53 of Fig. 4.

It will be observed that the parts hereinbefore referred to as "transoms" and "transom-castings" form an effective form of truck-bolster.

It is believed that my invention is so simple that no description of its operation is necessary, yet I prefer to state that by providing a truck in which the whole weight is carried by four rockers with spherical ends or bases which permit a rolling movement a car is enabled to take curves with the greatest ease, and by employing a central bearing, or rather swivel, for no weight is carried by it, the car is capable of resisting sudden strains which it otherwise could not. For instance, when a car is standing with braked wheels and another car is switched against it and rams into it with full force the shock is received by the draw-bar, delivered by it to the car-sill, from thence to the pivot or king-pin, and finally to the truck through the elastic coiled spring in the annular bearing 50. Thus the shock is lessened on the truck and upon the pivotal pin and the draw-bar. This elastic socket with the spherical-ended rockers will be found of great advantage for trucks or cars running over an uneven track where there is considerable sidewise swaying and jerking of the car-body. Having an elastic socket in the annular casting, these jerks are received by the coiled spring in the annular pocket and softened in their effect upon the car-truck or car-body, or vice versa.

I am of course aware that it has been before proposed to support a car on side bearings where no weight is borne at the center and also that it is old to support a car on side rockers of various sorts, and hence do not claim either of these broadly. At the same time my invention is capable of other modifications than those herein described, and I do not limit my claims to the exact structure shown, but intend them to cover such variations as naturally fall within the lines of my invention.

What I claim as new is—

1. In a car-truck, spherical-ended rockers supporting the car-body on opposite sides of the central pivot, substantially as described.

2. In a car-truck, spherical-ended rockers or supports forming the sole supports of the car-body on opposite sides of the central pivot, substantially as described.

3. In a car-truck, elongated rockers having spherical ends supporting the car-body on opposite sides of the central pivot, substantially as described.

4. In a car-truck and in combination with dropped pockets or bearings, spherical-ended rockers seated in said pockets or bearings and supporting the car-body on their upper spherical ends, substantially as described.

5. In a car-truck, elongated rockers having a central portion connecting two conical ends, the ends being formed spherical and supporting the load thereon, substantially as described.

6. In a car-truck and in combination with dropped pockets or bearings carried thereby, elongated rockers or supports having a central portion and two conical extensions at the top and bottom thereof; the said extensions each having spherical ends, the lower ones resting in said dropped pockets or bearings and the upper ones supporting the car-body, substantially as described.

7. In a car-truck, and in combination with bearings or pockets, spherical-ended rockers or supports resting on said bearings or pockets and supporting the load, and a central pivot permitting the car-body to swing thereon but bearing none of its weight, substantially as described.

8. In a car-truck and in combination with bearings or pockets dropped downward and supported thereby, elongated spherical-ended rockers resting in said dropped pockets and having the car-body resting thereon, and a central pivot permitting the car-body to swing thereon as a center and supporting none of its weight, substantially as described.

9. In a car-truck, the combination of a central pivot and a support on each side thereof for the car-body; the said central pivot having a yielding connection with the truck and permitting a slight lateral movement therein, substantially as described.

10. In a car-truck, the combination of a central pivot and a support on each side thereof for the car-body; the said central pivot having a yielding spring connection with the truck and thereby permitting lateral movement, substantially as described.

11. In a car-truck, the combination of a central pivot having a yielding connection, and a support on each side thereof for the car-body; the said central pivot supporting no part of the load, substantially as described.

12. In a car-truck, the combination of a central pivot having a yielding connection, and an elongated spherical-ended rocker or support on each side thereof for supporting the car-body, substantially as described.

13. In a car-truck, the combination of a central pivot, a pocket therefor and a spring contained within the pocket and affording an elastic connection between said pocket and said pivot, substantially as described.

14. In a car-truck, the combination of a central pivot, a bearing therefor receiving none of the weight but permitting a slight lateral movement of said pivot, a pocket in said bearing, and a spring contained within the pocket and coacting with said pivot, substantially as described.

15. In a car-truck, the combination of a central pivot, a bearing therefor receiving none of the weight and having a pocket, a spring contained in said pocket and permitting lateral movement of the pivot therein, and an elongated spherical-ended rocker on each side of said central pivot receiving the whole weight of the car-body, substantially as described.

16. In a car-truck, a transom-casting having a dropped pocket in its bottom side, substantially as described.

17. In a car-truck, a transom-casting having a dropped pocket in its bottom side, and weep-openings in said dropped pocket, substantially as described.

18. In a car-truck, a transom-casting on each side of the truck having a pocket thereon, and rockers or supports seated in said pockets and supporting the sides of the car, substantially as described.

19. In a car-truck, a transom having a pocket at each end thereof, and rockers or supports seated in said pockets and supporting the sides of the car, substantially as described.

20. In a car-truck, a transom-casting on each side of the truck having pockets therein dropped down below the transom proper, and supports seated in said pockets and having the car-body resting thereon, substantially as described.

21. In a car-truck, the combination of a transom-casting on each side of the car, transoms connecting said castings, and bearings for side supports projecting from said transom-castings, substantially as described.

22. In a car-truck, the combination with a transom-casting on each side of the truck, transoms connecting said castings, and pockets depending from said castings adapted to contain the supports for the car-body, substantially as described.

23. In a car-truck, the combination with a transom-casting on each side of the truck, transoms connecting said castings, and pockets depending from said castings adapted to contain the supports for the car-body and having weep-holes therein, substantially as described.

24. In a car-truck, transom-castings on opposite sides thereof, transoms connecting the same, and dropped pockets extending downward from said castings and having their side walls between the transoms, substantially as described.

25. In a car-truck, the combination of a pair of transoms, a bearing supported thereby having a pocket therein and a central pivot entering said pocket and having lateral movement therein, substantially as described.

26. In a car-truck, the combination with a pair of transoms, a bearing supported thereby having a pocket therein, a central pivot entering said pocket and having lateral movement therein, and a spring within the pocket to resist said movement or ease the jar upon excessive impact, substantially as described.

27. In a car-truck, the combination of a transom-casting on each side of the truck, a pair of transoms connecting said castings, the transom-castings having pockets for the side supports and the transoms supporting a central bearing, substantially as described.

28. A side frame for car-trucks comprising a central frame, a triangular frame on each side thereof each of said triangular frames having its apex toward said central frame and having a part extending upwardly from the central frame whereby the side frame is depressed at its center, and integral members connecting the lower side of the said central frame with its triangular frames, substantially as described.

29. A side frame for car-trucks comprising a dropped central frame, a triangular frame extending upwardly from said central frame on each side thereof, integral members connecting the lower side of said frame with said triangular frames, integral overhanging members on each side of the central frame, and guiding and retaining members pivoted to said overhanging members and forming the housings for journal-boxes, substantially as described.

30. In a car-truck side frames each comprising a central frame, a triangular frame on each side of said central frame and having integral members connecting them with said central frame, transoms connecting the central frame of one side frame with the central frame of the opposite frame and transom-castings connecting said transoms and the central frames, substantially as described.

31. In a car-truck, the combination with a body-bolster having a center pin, of a truck-bolster provided with a pivot-opening for said pin and with side bearing-columns resting on the truck-bolster and supporting the car-bolster and designed to freely rock upon the ends as the bolsters turn about the pivot-pin.

32. The combination with a car body-bolster and centering means, of a truck-bolster having depending pockets therein, and side bearing-columns resting in said pockets and supporting the body-bolster, said columns being free to rock at both ends, substantially as described.

33. In a car-truck, the combination with a body-bolster having a center pin, of a truck-bolster provided with a pivot-opening for said pin and with spherical-ended side bearing-columns resting on the truck-bolster and supporting the car-bolster and designed to freely rock upon said spherical ends as the bolsters turn about the pivot-pin.

34. The combination of a car body-bolster and centering means, of a truck-bolster having depending pockets therein, and spherical-ended side bearing-columns resting in said pockets and supporting the body-bolster, said columns being free to rock at both ends, substantially as described.

35. In a car, the combination of a central pivot or swivel pin, and yielding means permitting lateral movement in all directions, substantially as described.

36. In a car, the combination with a swivel-pin, of a transom movable laterally with respect to said swivel-pin, and yielding means mounted on the transom coöperating with said swivel-pin to center the same with respect to the transom, substantially as described.

Signed by me at New York this 7th day of October, 1903.

GUSTAV LINDENTHAL

Witnesses:
M. B. SANFORD,
T. W. SCHMIDT.